US011281190B2

(12) United States Patent
Grosch et al.

(10) Patent No.: US 11,281,190 B2
(45) Date of Patent: Mar. 22, 2022

(54) METHOD FOR SETTING UP A REDUNDANT COMMUNICATION CONNECTION, AND FAILSAFE CONTROL UNIT

(71) Applicant: Siemens Aktiengesellschaft, Munich (DE)

(72) Inventors: Thomas Grosch, Roβtal (DE); Jürgen Laforsch, Bühl (DE); Albert Renschler, Ettlingen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/369,171

(22) Filed: Mar. 29, 2019

(65) Prior Publication Data
US 2019/0302742 A1    Oct. 3, 2019

(30) Foreign Application Priority Data
Mar. 29, 2018    (EP) .................................... 18164975

(51) Int. Cl.
*G05B 19/418*    (2006.01)
*H04L 12/40*    (2006.01)

(52) U.S. Cl.
CPC ..... *G05B 19/4184* (2013.01); *G05B 19/4186* (2013.01); *H04L 12/40176* (2013.01);
(Continued)

(58) Field of Classification Search
CPC ......... H04L 12/40176; H04L 12/40182; H04L 12/40202; H04L 2012/4026;
(Continued)

(56) References Cited

U.S. PATENT DOCUMENTS

| 5,202,822 A | 4/1993 | McLaughlin et al. |
| 9,524,259 B2 | 12/2016 | Grosch et al. |

(Continued)

FOREIGN PATENT DOCUMENTS

| CA | 2875518 | 4/2015 |
| CN | 101592941 | 12/2009 |

(Continued)

OTHER PUBLICATIONS

Office Action dated Nov. 30, 2021 issued in Chinese Patent Application No. 201910246821.6.

*Primary Examiner* — Jason D Recek
(74) *Attorney, Agent, or Firm* — Cozen O'Connor (57) ABSTRACT

Method for setting up a redundant communication connection, and failsafe control unit, wherein a transport and/or networking functional unit of a communication device utilizes at least one communication network address associated with a primary control device and/or a secondary control device to set up two communication connections to a failsafe control unit that includes the primary control device and the secondary control device, where data transmitted via a first communication connection are forwarded from the primary control device to the secondary control device via a first synchronization connection such that data transmitted via a second communication connection are forwarded from the secondary control device to the primary control device via a second synchronization connection.

15 Claims, 3 Drawing Sheets

(52) U.S. Cl.
CPC .. *H04L 12/40182* (2013.01); *H04L 12/40202* (2013.01); *G05B 2219/31186* (2013.01); *H04L 2012/4026* (2013.01)

(58) Field of Classification Search
CPC ............ G05B 19/4184; G05B 19/4186; G05B 2219/31186
See application file for complete search history.

(56) References Cited

U.S. PATENT DOCUMENTS

| | | | | |
|---|---|---|---|---|
| 2003/0061384 | A1* | 3/2003 | Nakatani | H04L 61/2038 709/245 |
| 2009/0265493 | A1 | 10/2009 | Mendu | |
| 2010/0030937 | A1 | 2/2010 | Schuermann et al. | |
| 2011/0161538 | A1* | 6/2011 | Decker | G06F 11/2005 710/110 |
| 2013/0019040 | A1 | 1/2013 | Sueki et al. | |
| 2013/0265910 | A1* | 10/2013 | Hillen | H04L 41/0806 370/255 |
| 2015/0281367 | A1* | 10/2015 | Nygren | H04L 65/1066 709/228 |
| 2015/0319270 | A1* | 11/2015 | Roeland | H04L 61/6013 370/254 |
| 2016/0036626 | A1 | 2/2016 | Bale et al. | |
| 2016/0197881 | A1 | 7/2016 | Albrecht | |
| 2016/0226980 | A1 | 8/2016 | Albrecht | |
| 2017/0351252 | A1 | 12/2017 | Kleifges et al. | |

FOREIGN PATENT DOCUMENTS

| | | |
|---|---|---|
| CN | 105278327 | 1/2016 |
| CN | 106664260 | 5/2017 |
| CN | 107390511 | 11/2017 |
| DE | 102013211406 | 12/2014 |
| EP | 2547045 | 1/2013 |
| EP | 2881812 | 6/2015 |
| EP | 3001647 | 3/2016 |
| EP | 3051371 | 8/2016 |

* cited by examiner

METHOD FOR SETTING UP A REDUNDANT COMMUNICATION CONNECTION, AND FAILSAFE CONTROL UNIT

BACKGROUND OF THE INVENTION

1. Field of the Invention

The invention relates to industrial automation systems and, more particularly, to a method for setting up a redundant communication connection between a communication device and a failsafe control unit 200 associated with an industrial automation system.

2. Description of the Related Art

Industrial automation systems are used for monitoring, open-loop control and closed-loop control of technical processes, in particular in the field of production, process and buildings automation, and allow substantially independent operation of control facilities, sensors, machines and technical installations. A fundamental basis for reliable provision of monitoring, open-loop control and closed-loop control functions via a process automation system consists in complete and correct detection and mapping of components of the industrial process automation system in an engineering and/or project planning system.

Interruptions to communication connections between computer units of an industrial automation system or automation devices can lead to undesirable or unnecessary repetition of a transmission of a service request. Additionally, messages that are not transmitted or that are not completely transmitted can prevent, for example, an industrial automation system from being transferred to or remaining in a safe operating state. This can finally lead to failure of an entire production installation and to a costly production stoppage. In industrial automation systems, a particular problem regularly results from message traffic with comparatively many, but relatively short, messages, as a result of which the above problems are intensified.

DE 10 2013 211 406 A1 discloses the high-availability connection of automation devices having completely independent Ethernet interfaces to simply connected automation devices within a redundant communication network that involves the use of a Y-switch for the respective simply connected automation device. In this case, a Y switch is connected to a first or subnetwork of a redundant communication network via a first or second port, while being indirectly or directly connected to the simply connected automation device via a third port. Besides that, incoming data frames at the first, second or third port are associated with a first, second or third VLAN. Additionally, the first and second ports are configured as untagged members for the first and third VLANs or for the second and third VLANs. The third port is configured as an untagged member for all three VLANs. Unicast MAC addresses learned at the first two ports are automatically adopted as a static entry for the third VLAN. When a unicast MAC address learned at the first two ports is erased, the corresponding static entry for the third VLAN is also erased.

In the case of a secure communication connection to a communication device, connected to an industrial automation system, via an unsecure subnetwork, a monitoring unit, according to EP 3 001 647 B1, checks whether a new communication network address associated with the communication device for a connection to the unsecure subnetwork becomes valid. When a communication network address is changed and a secure communication connection still exists, the monitoring unit transmits an address change announcement via the existing secure communication connection. When an address change announcement is received, setup of an additional secure communication connection and changeover from the existing secure communication connection to the additional secure communication connection are initiated.

EP 3 051 371 B1 describes a method for setting up an uninterrupted communication connection to a communication device associated with an industrial automation system. In this case, a monitoring unit associated with the communication device checks whether a second communication network address associated with the first communication device becomes valid. When a new valid communication network address and the existing communication connection are associated, the monitoring unit initiates setup of an additional communication connection according to Multipath TCP (Transmission Control Protocol).

EP 2 881 812 B1 relates to a method for operating an automation device whose CPU module is designed to effect read or write access to local peripheral modules. The local peripheral modules each comprise two interface modules that are each connected to an input and output controller within a ring topology. Peripheral access operations are performed via one or two rings. A redundancy manager provided for each ring is used to logically interrupt the respective ring in a normal mode. In the event of a physical ring interruption, a ring reconfiguration is initiated for the respective ring. Based on suitable measures, peripheral access operations are already possible during a ring reconfiguration.

European patent application EP17181169.8 discloses an arrangement having two redundant systems operating in parallel in a cyclic mode. The two systems monitor one another reciprocally and regularly with respect to the results of tasks accomplished by the respective other system. In the event of an error being found, one of the systems is selected or confirmed for the productive operation. This results in at least one respective characteristic quantity for an operating parameter being captured for each system in multiple or all cycles and being used for updating at least one statistical parameter. If a disparity in the results of the two systems is found, then a current operating parameter is related to the associated statistical parameter for each system. The system for which the current operating parameter differs from the associated statistical parameter less is detected as the correctly operating system and used for productive operation.

SUMMARY OF THE INVENTION

It is an object of the present invention to provide a method and apparatus for setting up a redundant communication connection between a failsafe control unit having redundant subsystems and a communication device that allows communication between the failsafe control unit and the communication device substantially independent of an initially prescribed number of redundant subsystems.

This and other objects and advantages are achieved in accordance with the invention by a method and by a control unit, where the method in accordance with the invention is intended for setting up a redundant communication connection between a communication device and a failsafe control unit that is associated with an industrial automation system and comprises at least a primary control device and a secondary control device. Here, the primary control device and the secondary control device are redundant with respect to one another. The communication device can form, for example, part of an automation device. A transport and/or networking functional unit of the communication device uses at least one communication network address associated with the primary control device and/or the secondary control device to set up two communication connections to the failsafe control unit. Upon a request of a communication device for setting up a communication connection, the primary control device and the secondary control device can provide, for example, a piece of address information for the respective other control device.

In accordance with the invention, the transport and/or networking functional unit of the communication device sets up a first communication connection to a transport and/or networking functional unit of the primary control device and a second communication connection to a transport and/or networking functional unit of the secondary control device. Advantageously, the first communication connection and the second communication connection are set up according to Transmission Control Protocol. Data transmitted via the first communication connection are forwarded from the primary control device to the secondary control device via a first synchronization connection. In contrast, data transmitted via the second communication connection are forwarded from the secondary control device to the primary control device via a second synchronization connection. In this manner, easily and reliably scalable redundant communication connections to a failsafe control unit can be set up.

In accordance with a preferred embodiment of the present invention, the transport and/or networking functional unit of the primary control device and the transport and/or networking functional unit of the secondary control device each have a Multipath TCP functionality. Accordingly, the transport and/or networking functional unit of the communication device also has a Multipath TCP functionality. Advantageously, the first communication connection and the second communication connection are each set up as corresponding Multipath TCP subflows. Here, the first communication connection is a first Multipath TCP subflow, while the second communication connection is a second Multipath TCP subflow. Preferably, the first synchronization connection and the second synchronization connection between the primary control device and the secondary control device are also set up as corresponding Multipath TCP subflows.

The transport and/or networking functional unit of the primary control device and the transport and/or networking functional unit of the secondary control device each manage, in accordance with a particularly preferred embodiment of the present invention, both a connection associated with the first Multipath TCP subflow and a connection associated with the second Multipath TCP subflow. In particular, the transport and/or networking functional unit of the secondary control device associates, in accordance with a further embodiment, data of the first communication connection that are forwarded via the first synchronization connection with the first Multipath TCP subflow. Accordingly, the transport and/or networking functional unit of the primary control device associates data of the second communication connection that are forwarded via the second synchronization connection with the second Multipath TCP subflow.

In accordance with an alternative embodiment of the present invention, only the first communication connection is initially used to transmit data, where the second communication connection is set up as a standby connection. Only in the event of failure of the first communication connection are data transmitted via the second communication connection in this case.

In accordance with a further alternative embodiment of the present invention, data segments to be transmitted between the communication device and the failsafe control unit are alternately transmitted via the first communication connection or via the second communication connection. In particular, data segments to be transmitted between the communication device and the failsafe control unit are in this case divided into first data segments, which are transmitted only via the first communication connection, and into second data segments, which are transmitted only via the second communication connection. This can be effected, for example, based on a utilization level of the communication connections.

The transport and/or networking functional units of the control devices or of the communication device are configured, in particular, for processing an Internet protocol stack. By way of example, the transport and/or networking functional units can be integrated in the communication device or in the control devices, where the transport and/or networking functional units each use a communication network adapter driver to access a communication network adapter of the communication device or of the control devices. The communication network adapters each particularly comprise a transmission and reception unit and a control unit for coordinating access to a communication medium.

The failsafe control unit in accordance with the invention is intended for performing the method in accordance with the explanations above and comprises at least a primary control device and a secondary control device. The primary control device and the secondary control device are redundant with respect to one another and each comprise a transport and/or networking functional unit. Additionally, the failsafe control unit is configured so that a transport and/or networking functional unit of a communication device uses at least one communication network address associated with the primary control device and/or the secondary control device to set up two communication connections to the failsafe control unit.

In accordance with the invention, the failsafe control unit is configured so that data transmitted via a first communication connection between the communication device and the primary control device are forwarded from the primary control device to the secondary control device via a first synchronization connection. Furthermore, the failsafe control unit is configured so that data transmitted via a second communication connection between the communication device and the secondary control device are forwarded from the secondary control device to the primary control device via a second synchronization connection.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is described in more detail below using an exemplary embodiment with reference to the drawing, in which.

DETAILED DESCRIPTION OF THE EXEMPLARY EMBODIMENTS

Figure 1:
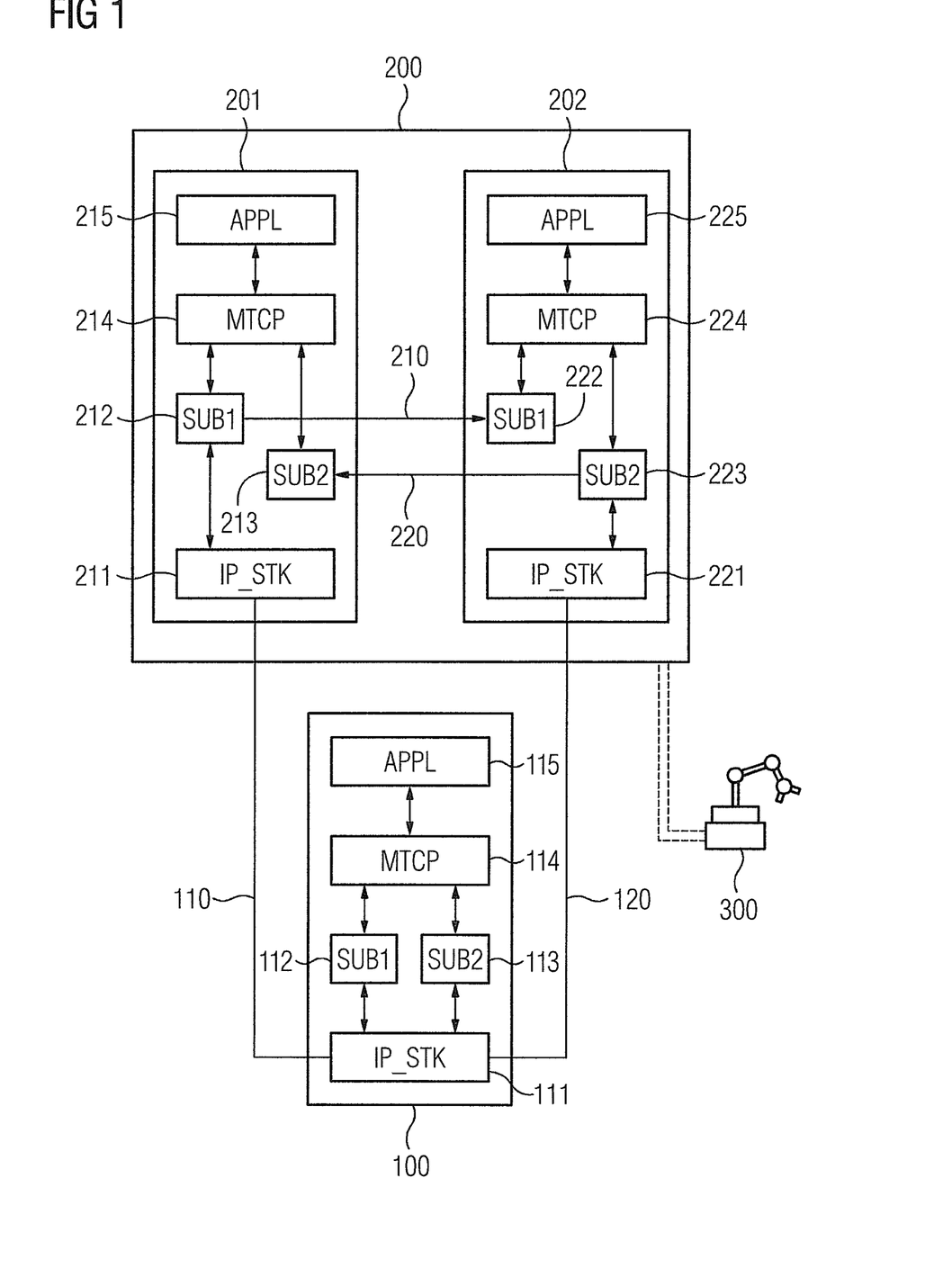
FIG. 1 shows an industrial automation system with at least one failsafe control unit and a communication device communicating therewith in accordance with the invention.

The industrial automation system depicted in simplified fashion in FIG. 1 comprises a failsafe control unit 200, in particular a programmable logic controller, having a primary control device 201 and a secondary control device 202. Programmable logic controllers usually each comprise a communication module, a central unit and at least one input/output unit. Communication modules can be used to connect programmable logic controllers, for example, to a switch or router or to a field bus. Input/output units are used for exchanging control and measured variables between programmable logic controllers and machines or apparatuses 300 controlled by programmable logic controllers. The central units are particularly provided for ascertaining suitable control variables from captured measured variables. The above components of programmable logic controllers are preferably connected to one another via a backplane bus system.

The primary control device 201 and the secondary control device 202 are redundant with respect to one another and each comprise a switching functional unit 211, 221 for processing an Internet protocol stack, a transport functional unit 214, 224 with Multipath TCP functionality and a runtime environment 215, 225 for applications or control programs. The switching functional units 211, 221 each use a communication network adapter driver to access a communication network adapter of the respective control device. In turn, the communication network adapters each comprise a transmission and reception unit and a control unit for coordinating access to a communication medium.

In the present exemplary embodiment, the failsafe control unit 200 is a high-availability system. Usually, a system is deemed to have high availability if an application provided by the system continues to be available, and can continue to be used without direct human intervention, even in the event of failure of a system component. No or only minimal interruption should be perceptible to a user, here. If, for example, a control device 201, 202 of the failsafe control unit 200 fails, then seamless changeover to the remaining control device is effected. High availability in a system accordingly means ensuring unrestricted operation in the event of failure of one of its system components.

The primary control device 201 and the secondary control device 202 in the present exemplary embodiment have central units configured both for asynchronous coupling and for synchronous coupling. In the case of synchronous coupling, control programs or program paths of the control programs are executed in timing sync in the primary control device 201 and in the secondary control device 202. At program points at which there is provision for alignment between the two control devices 201, 202, the two control devices 201, 202 await a response of the respective other control device and only then each continue their program processing.

For asynchronous coupling, the primary control device 201 can be allocated, for example, a master role, while the secondary control device 202 can have a slave role. If the primary control device 201 fails under these prerequisites, the secondary control device 202 takes on the master role. So that the primary control device 201 and the secondary control device 202 can process their respective control programs or program paths temporally asynchronously, they synchronize themselves via synchronization connections 210, 220. On this basis, redundancy and monitoring functions are performed. Temporally asynchronous processing of the control programs or program paths involves the control device with the slave role executing preferably only program paths that have been passed by the control device with the master role. A detailed description pertaining to asynchronous coupling can be found in EP 2 657 797 A1.

In addition to the failsafe control unit 200, the industrial automation system depicted in FIG. 1 comprises a communication device 100 that can be integrated, for example, in an automation device and is preferably connected to the failsafe control unit 200 via an Ethernet-based communication network. Automation devices can be, in particular, operating and observation stations, programmable logic controllers, RFID readers or systems for automatic image processing. Operating and observation stations are used for visualizing process data or measured and control variables processed or captured by programmable logic controllers, input/output units or sensors. In particular, operating and observation stations are used for displaying values of a control loop and for altering control parameters. Operating and observation stations comprise at least a graphical user interface, an input device, a processor unit and a communication module. Additionally, the communication device 100 can, for example, also be associated with an engineering system for project planning for automation devices or with a control system for monitoring automation devices, or can be a corresponding system component.

In addition to automation devices, the industrial automation system can also comprise network infrastructure devices, such as switches, routers or firewalls. These network infrastructure devices are particularly used for connecting programmable logic controllers, input/output units (I/O modules) or operating and observation stations of the industrial automation system. Input/output units can be configured as local peripheral modules arranged remotely from a programmable logic controller.

Fundamentally, the control devices 201, 202 can also be redundantly operated server units of a cloud, edge or fog computing system. Such computing systems each comprise multiple server units providing IT infrastructure, such as storage space, computation power or application software, as a service. In particular, the services provided by the server units can comprise applications or functions for system, process and device monitoring, for device control and configuration, for capture and analysis of measured values and state information associated with automation devices and also communication and automation functions.

In connection with redundantly operated server units of a cloud, edge or fog computing system, the communication device 100 can be in particular an edge computing client or a plant data hub. A plant data hub as data distributor unit or network infrastructure device can be used to connect a multiplicity of communication or automation devices to a cloud, edge or fog computing system.

Communication device 100 also comprises a switching functional unit 111 for processing an Internet protocol stack, a transport functional unit 114 with Multipath TCP functionality and a runtime environment 115 for applications or control programs. Analogously to the explanations above, the switching functional unit 111 uses a communication network adapter driver to access a communication network adapter of the communication device 100. In turn, the communication network adapter comprises a transmission and reception unit and a control unit for coordinating access to a communication medium.

The transport functional unit 114 of the communication device 100 uses at least one communication network address associated with the primary control device 201 and/or the secondary control device 202 to set up two communication connections to the failsafe control unit 200. Advantageously, the primary control device 201 and the secondary control device 202 respond to a request of a communication device for setting up a communication connection by providing a piece of address information for the respective other control device. It is thus sufficient if the communication device 100 initially has only a communication address of one of the two control devices 201, 202 available.

The transport functional unit 114 of the communication device 100 sets up a first communication connection 110 to the transport functional unit 214 of the primary control device 201 and a second communication connection 120 to the transport functional unit 224 of the secondary control device 201. In both cases, this is effected in accordance with Transmission Control Protocol. This results in the transport functional units 114, 214, 224 each producing corresponding Multipath TCP subflows 112-113, 212-213, 222-223 for the first communication connection 110 and the second communication connection 120. A respective first Multipath TCP subflow 112, 212, 222 is produced for the first communication connection 110, while a respective second Multipath TCP subflow 113, 213, 223 is produced for the second communication connection 120.

Data transmitted via the first communication connection 110 are forwarded from the primary control device 201 to the secondary control device 202 via a first synchronization connection 210. Accordingly, data transmitted via the second communication connection 220 are forwarded from the secondary control device 202 to the primary control device 201 via a second synchronization connection 220. Optical Ethernet transmission links are preferably used for the synchronization connections 210, 220.

The transport functional unit 214 of the primary control device 201 and the transport functional unit 224 of the secondary control device 202 therefore each manage a connection associated with the first Multipath TCP subflow 212, 222 and a connection associated with the second Multipath TCP subflow 213, 223. In particular, the transport functional unit 224 of the secondary control device 202 associates data of the first communication connection 110 that are forwarded via the first synchronization connection 210 with the first Multipath TCP subflow 222, while the transport functional unit 214 of the primary control device 201 associates data of the second communication connection 120 that are forwarded via the second synchronization connection 220 with the second Multipath TCP subflow 213.

If one of the two control device 201, 202 fails, or if a data transmission on one of the two communication connections 110, 120 is disturbed, then the communication device 100 can continue to reach the failsafe control unit 200 via the remaining communication connection. This is ensured transparently on the basis of Multipath TCP for applications running on the communication device 100 and on the control devices 201, 202. A failure or disturbance leads at most to a reduced data throughput.

Besides that, the two communication connections 110, 120 can fundamentally be loaded asymmetrically by virtue of one of the two Multipath TCP subflows being set up just as a reserve and data transmission being effected only via an actively used Multipath TCP subflow. In such a case, for example, only the first communication connection 110 is initially used to transmit data, while the second communication connection 120 is set up as a standby connection. Only in the event of failure of the first communication connection 110 are data transmitted via the second communication connection 120.

Additionally, load distribution methods can also be used for the two communication connections 110, 120 too. By way of example, data segments to be transmitted between the communication device 100 and the failsafe control unit 200 are transmitted selectively and based on a load via the first communication connection 110 or via the second communication connection 120. To this end, data segments to be transmitted between the communication device 100 and the failsafe control unit 200 are divided into first data segments, which are transmitted only via the first communication connection 110, and into second data segments, which are transmitted only via the second communication connection 120.

Figure 2:
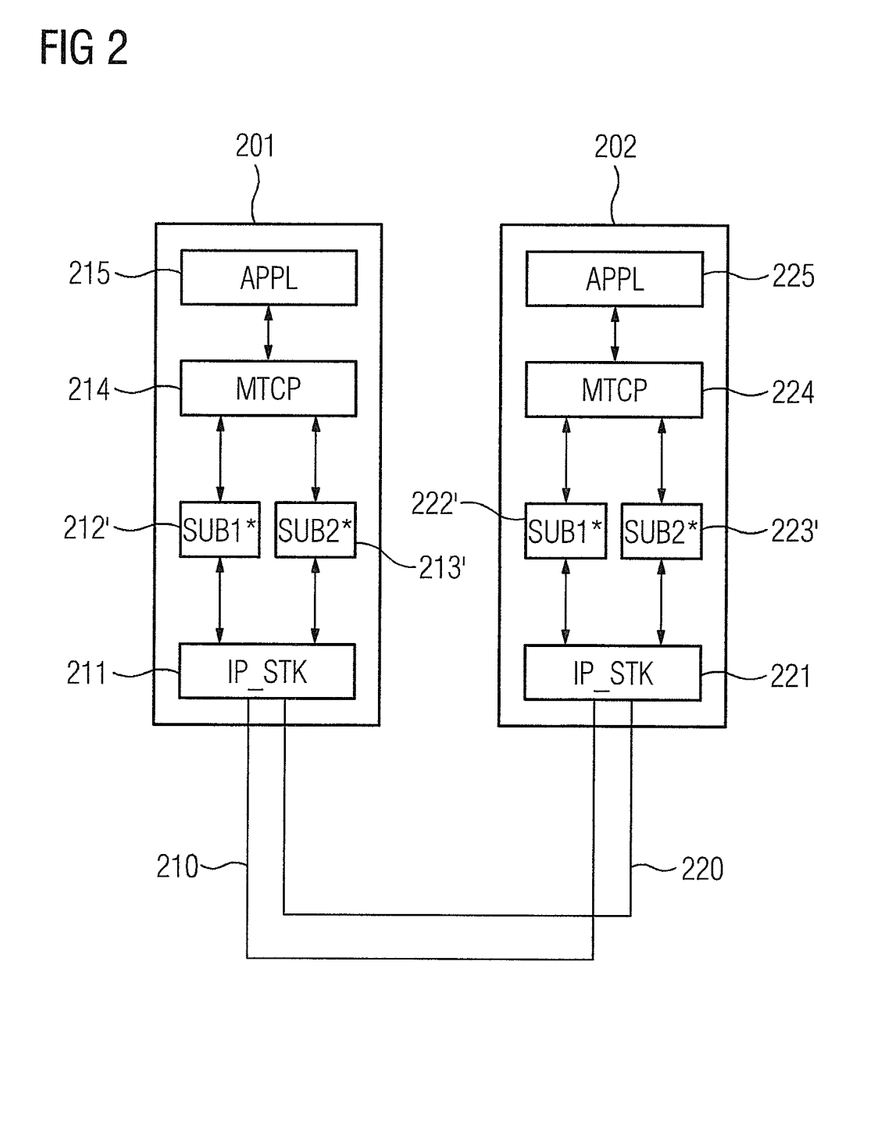
FIG. 2 shows a detailed depiction of a synchronization within the failsafe control unit in accordance with the invention.

In accordance with FIG. 2, Multipath TCP is preferably also used for the synchronization connections 210, 220 between the primary control device 201 and the secondary control device 202. In this case, corresponding Multipath TCP subflows 212'-213', 222'-223', which are each managed by the transport functional units 214, 224 of the control devices 201, 202, are produced for the first synchronization connection 210 and the second synchronization connection 220. Use of Multipath TCP for the synchronization connections 210, 220 is extremely advantageous in some operating states of a redundant automation system, in particular if considerable volumes of data need to be transmitted for reintegration of a control device 201, 202. Since such processes are supposed to occur as quickly as possible, bundling of transmission rates of the two synchronization connections is advantageous and leads to improved system performance and to increased availability.

Figure 3:
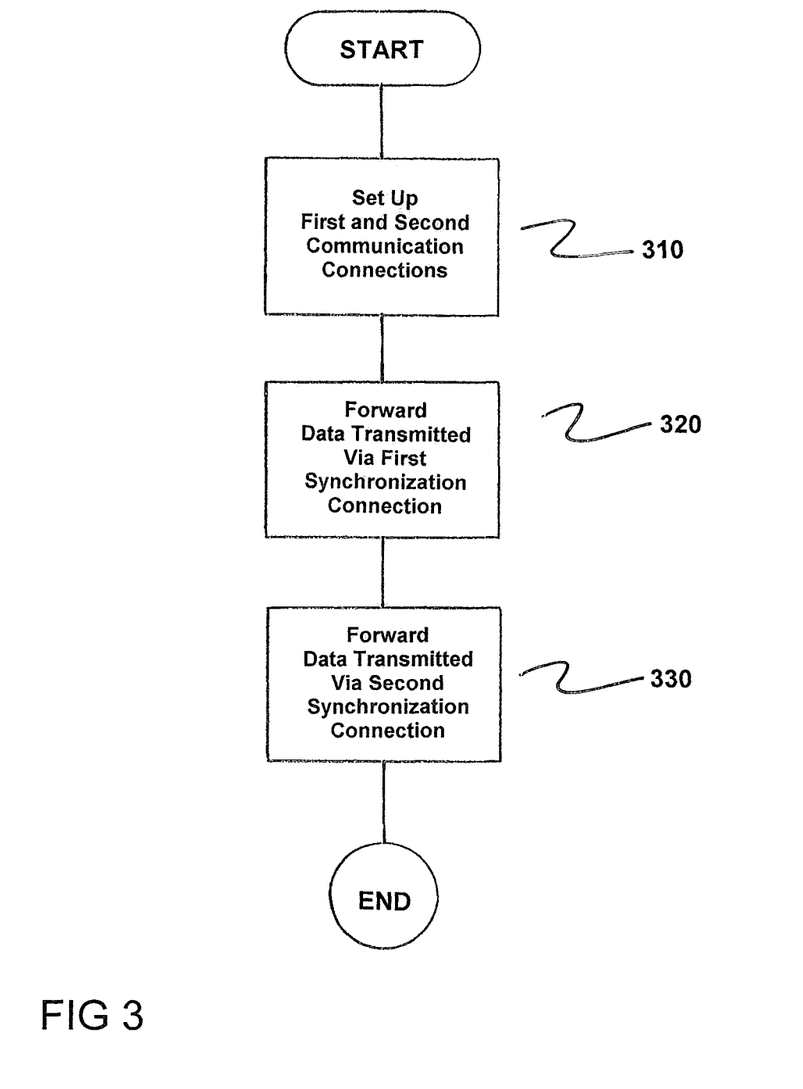
FIG. 3 is a flowchart of the method in accordance with the invention.

Figure s is a flowchart of the method for setting up a redundant communication connection between a communication device and a failsafe control unit 200 associated with an industrial automation system and comprising at least a primary control device 201 and a secondary control device 202, where the primary and secondary control devices 201, 202 are redundant in relation to one another, and a transport and/or networking functional unit 111, 114 of the communication device 100 utilizes at least one communication network address associated with either the primary control device and/or the secondary control device to set up two communication connections to the failsafe control unit.

The method comprises setting up, by the transport and/or networking functional unit of the communication device, a first communication connection 110 to a transport and/or networking functional unit 211, 214 of the primary control device and a second communication connection 120 to a transport and/or networking functional unit 221, 224 of the secondary control device, as indicated in step 310.

Next, data transmitted via the first communication connection is forwarded from the primary control device to the secondary control device via a first synchronization connection 210, as indicated in step 320.

Next, data transmitted via the second communication connection from the secondary control device is forwarded to the primary control device via a second synchronization connection 220, as indicated in step 330.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for setting up a redundant communication connection between a communication device and a failsafe control unit associated with an industrial automation system and comprising at least a primary control device and a secondary control device, the primary and secondary control devices being redundant in relation to one another, the method comprising:
   setting up, by the transport and/or networking functional unit of the communication device, a first communication connection to a transport and/or switching functional unit of the primary control device and a second communication connection to a transport and/or networking functional unit of the secondary control device;
   forwarding data transmitted via the first communication connection from the primary control device to the secondary control device via a first synchronization connection within the failsafe control unit; and
   forwarding data transmitted via the second communication connection from the secondary control device to the primary control device via a second synchronization connection within the failsafe control unit;
   wherein a transport and/or networking functional unit of the communication device utilizes at least one communication network address associated with at least one of (i) the primary control device and (ii) the secondary control device to set up two communication connections to the failsafe control unit.

2. The method as claimed in claim 1, wherein the first communication connection and the second communication connection are set up in accordance with Transmission Control Protocol (TCP).

3. The method as claimed in claim 2, wherein the transport and/or networking functional unit of the primary control device and the transport and/or networking functional unit of the secondary control device each have a Multipath TCP functionality; and wherein the transport and/or networking functional unit of the communication device has a Multipath TCP functionality.

4. The method as claimed in claim 3, wherein the first communication connection and the second communication connection are each set up as corresponding Multipath TCP subflows; wherein the first communication connection is a first Multipath TCP subflow; and wherein the second communication connection is a second Multipath TCP subflow.

5. The method as claimed in claim 4, wherein the transport and/or networking functional unit of the primary control device and the transport and/or networking functional unit of the secondary control device each manage a connection associated with the first Multipath TCP subflow and a connection associated with the second Multipath TCP subflow.

6. The method as claimed in claim 5, wherein the transport and/or networking functional unit of the secondary control device associates data of the first communication connection forwarded via the first synchronization connection within the failsafe control unit with the first Multipath TCP subflow; and wherein the transport and/or networking functional unit of the primary control device associates data of the second communication connection forwarded via the second synchronization connection within the failsafe control unit with the second Multipath TCP subflow.

7. The method as claimed in claim 1, wherein only the first communication connection is initially utilized to transmit data; wherein the second communication connection is set up as a standby connection; and wherein only in an event of failure of the first communication connection are data transmitted via the second communication connection.

8. The method as claimed in claim 1, wherein data segments to be transmitted between the communication device and the failsafe control unit are divided into first data segments which are transmitted only via the first communication connection, and are divided into second data segments which are transmitted only via the second communication connection.

9. The method as claimed in claim 1, wherein the first synchronization connection within the failsafe control unit and the second synchronization connection within the failsafe control unit are set up as corresponding Multipath Transmission Control Protocol (TCP) subflows between the primary control device and the secondary control device.

10. The method as claimed in claim 1, wherein the primary control device and the secondary control device respond to a request of a communication device for setting up a communication connection by providing a piece of address information for the respective other control device.

11. The method as claimed in claim 1, wherein the transport and/or networking functional units are configured to process an Internet protocol stack.

12. The method as claimed in claim 1, wherein the transport and/or networking functional units are integrated in at least one of (i) the communication device and/or (ii) the control devices; and wherein the transport and/or networking functional units each utilize a communication network adapter driver to access a communication network adapter of at least one of (i) the communication device and (ii) the control devices.

13. The method as claimed in claim 12, wherein the communication network adapters each comprise a transmission and reception unit and a control unit for coordinating access to a communication medium.

14. A failsafe control unit, the failsafe control unit comprises:
   at least a primary control device and a secondary control device;
   wherein the primary control device and the secondary control device are redundant in relation to one another and each comprise a transport and/or networking functional unit;
   wherein the failsafe control unit is configured such that a transport and/or networking functional unit of a communication device utilizing at least one communication network address associated with at least one of (i) the primary control device and (ii) the secondary control device to set up two communication connections to the failsafe control unit;

wherein the failsafe control unit is further configured such that a first communication connection is utilized to forward data transmitted between the communication device and the primary control device from the primary control device to the secondary control device via a first synchronization connection within the failsafe control unit; and wherein the failsafe control unit is further configured so that a second communication connection is used to forward data transmitted between the communication device and the secondary control device from the secondary control device to the primary control device via a second synchronization connection within the failsafe control unit.

15. A method for setting up a redundant communication connection between a communication device and a failsafe control unit associated with an industrial automation system and comprising at least a primary control device and a secondary control device, the primary and secondary control devices being redundant in relation to one another, the method comprising:

setting up, by the transport and/or networking functional unit of the communication device, a first communication connection to a transport and/or switching functional unit of the primary control device and a second communication connection to a transport and/or networking functional unit of the secondary control device;

forwarding data transmitted via the first communication connection from the primary control device to the secondary control device via a first synchronization connection within the failsafe control unit; and forwarding data transmitted via the second communication connection from the secondary control device to the primary control device via a second synchronization connection within the failsafe control unit;

wherein a transport and/or networking functional unit of the communication device utilizes at least one communication network address associated with at least one of (i) the primary control device and (ii) the secondary control device to set up two communication connections to the failsafe control unit; and wherein data segments to be transmitted between the communication device and the failsafe control unit are alternately transmitted via the first communication connection or via the second communication connection.

* * * * *